Sept. 21, 1965 R. PFLUGER 3,207,591
GLASS REINFORCING APPARATUS
Filed Aug. 21, 1961 2 Sheets-Sheet 1

Inventor
Rudolf Pfluger
by
Michael S. Striker
Attorney

United States Patent Office 3,207,591
Patented Sept. 21, 1965

---

3,207,591
GLASS REINFORCING APPARATUS
Rudolf Pfluger, Brunn am Gebirge, Austria, assignor to Moosbrunner Glasfabriks-Aktiengesellschaft, Vienna, Austria
Filed Aug. 21, 1961, Ser. No. 132,829
5 Claims. (Cl. 65—147)

This invention relates to an apparatus for the continuous production of wire-reinforced glass, in which the reinforcing material is cooled until just before embedding in the molten glass, and is then introduced in the glass during the production of the glass band in the extruding device at a speed substantially corresponding to the flow speed of the glass.

It is known to produce safety plate glass by pressing together two separately formed and conveyed glass sheets with the reinforcement supplied in between them, wherein the glass sheets are allowed to flow along, for example, downwardly directed guide surfaces to embed between them the reinforcement.

It is also known to introduce wires into the molten glass during the extrusion of an endless glass band from a batch, so as to obtain glass plate with embedded wire by the extrusion process.

Another process provides for mechanically regulating the embedding depth of the wire or mesh in the glass material to be reinforced by means of screen-, rib-, tongue- or like members on the embedding rollers.

For the same purpose it has already been proposed to regulate the embedding depth of the reinforcing material without the use of mechanical devices, by cooling one side of the glass to be reinforced, whereby the thickness of the stiffened glass sheet determines the embedding depth of the wire or mesh.

According to another proposal the reinforcing material is supplied to the downwardly directed opening of a batch vat in such a way that the molten glass forms a tight bond with the wire material and envelops it, and is carried to the further operations by a conveying device.

In these and other prior solutions the wire material was introduced into the glass in heated condition. The cooling of the glass and of the reinforcing material hitherto primarily ferrous metals was carried out, in accordance with the different physical characteristics of these materials, in a non-homogeneous manner. The ferrous reinforcing materials stayed apparently at the high temperatures to which they were exposed by the heat radiation of the glass, and a series of disadvantageous chemical reactions occurred in the glass, for example "bubbling" and "smearing." Brownish, discolored spots were formed in the glass where the reinforcing material was embedded. Since iron oxide was formed before introduction of the heated wire into the highly plastic glass material, the oxide was reduced after introduction of the wire into the glass, so that bubbles were liberated. A further objectionable result of this oxidation process was an uneven greenish coloring of the glass product. By reason of the incandescent heating of the reinforcing material before its introduction into the glass, and by reason of stretching occurring due to the elevated temperature, the cross-section of the wire was lessened; furthermore, the high temperatures of the molten glass—by acting on the metallurgic composition of the reinforcing material—substantially lowered its strength.

The result was therefore exactly the opposite of what was sought by reinforcing, namely the glass did not obtain the desired increased strength. It has been shown that glass reinforced with ferrous materials is more fragile than unreinforced glass.

The further damaging side effect was also observed that the reinforcing material changed its position during the course of embedding in the rapidly but unevenly cooling glass. This was particularly noticeable if several wire strands were introduced close to each other, each strand presenting a non-uniform position with respect to the adjacent wires, and also with respect to the surface of the glass band. The embedding planes of the wires did not lie in the planes of symmetry of the finished glass bands, since the reinforcing material was frequently closer to the cooler marginal zones of the band.

The reinforcement, particularly in the case of weaves or meshes, had the effect of holding together the glass particles and thus of preventing the dangerous results of shattering, but did not achieve the desired strengthening of the reinforced material.

It has been attempted to reduce the disadvantageous effects of ferrous wire in reinforcing processes by enveloping the wire in a protective atmosphere, or by covering it with a grease coating. Reinforcing material prepared in this manner did in fact retain part of its strength. However, the other disadvantageous results—bubble formation, discoloration of the glass in the vicinity of the embedded materials, etc.—could not, however, be prevented.

The present invention has for its object the continuous production of reinforced glass, in which the reinforcing material retains its properties of strength even after embedding, and in which exact embedding of the reinforcing material is made possible, so as to influence favourably the acceptability of the finished product.

Within the framework of the above-stated object, the invention has the purpose of protecting the reinforcing material from the damaging effect of heat, particularly of the heat of the molten glass.

Further features and advantages of the invention are set forth in the following description.

The invention achieves its object by preferably supplying the reinforcing material to the molten glass from above, and at the same time cooling the material until immediately before its introduction into the glass, the reinforcing material being guided into the embedding plane at the latest possible movement while still being subjected to cooling.

Non-ferrous metal is advantageously used as raw material for the reinforcing. However, the invention is fully applicable to ferrous metals also.

In order that the reinforcing material may be led without tension through its guiding and cooling device, the speed at which the reinforcing material is supplied must correspond to that of the glass supplied to the shaping rollers.

The reinforcing material must not be allowed to reach the limit of elongation and flow.

In order to fulfil its guiding and cooling function the reinforcing material supply device consists essentially of a channel directed downwardly and slightly inclined to the vertical, provided at its lower end with a bend followed by a substantially horizontally directed outlet, preferably flat and closed on all sides in its longitudinal direction; the channel is enveloped by a bag-like cooling jacket, the in- and outlet openings of the channel being disposed on those sides of the cooling jacket which are remote from the glass stream.

The channel may also advantageously consist of parallel or superposed sections or may be divided into such sections, depending on the number, shape and nature of the reinforcing means.

Rearwardly of the outlet the horizontal portion of the channel is shielded against the heat radiating from below by the cooling jacket surrounding it.

It may be necessary and advantageous to divide the cooling jacket around the guide channel into chambers which may, where necessary, be connected together for enabling the cooling to be regulated.

To fulfil special cooling conditions, individual chambers or groups thereof may be fitted with individual inlets and outlets for cooling media.

It is preferable to taper the cross-section of the outlet with respect to the cross-section of the guiding channel. Especially for the introduction of individual wires, it is useful to make the guiding pipes conical.

Figure 1:
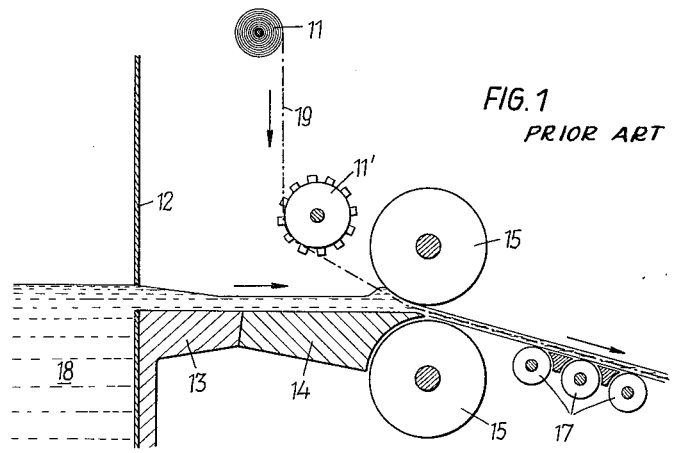
FIG. 1 is a schematical view showing by way of example a conventional apparatus for reinforcing glass as known in the prior art.

An illustrative review of the procedures employed hitherto for reinforcing glass is provided in FIG. 1.

As shown therein the reinforcing means 19 supplied from the storage location 11 over unrolling devices 11', for example rib-, bristle- or pin-rollers, according to whether the reinforcing material consists of individual wires or of meshes, was introduced entirely without any protection against the action of heat into the glass band 18, supplied from the batch vat 12 over the run piece 13 and the machine piece 14 to the extrusion rollers 15.

As clearly shown, the reinforcing material was therefore continuously exposed on the way from the storage to the embedding location to the very disadvantageous influence of the heat of radiation of the molten glass 18, so that the surface and structure of the reinforcing material were destroyed, and the resulting reinforcement of the finished product was unsatisfactory.

Figure 2:
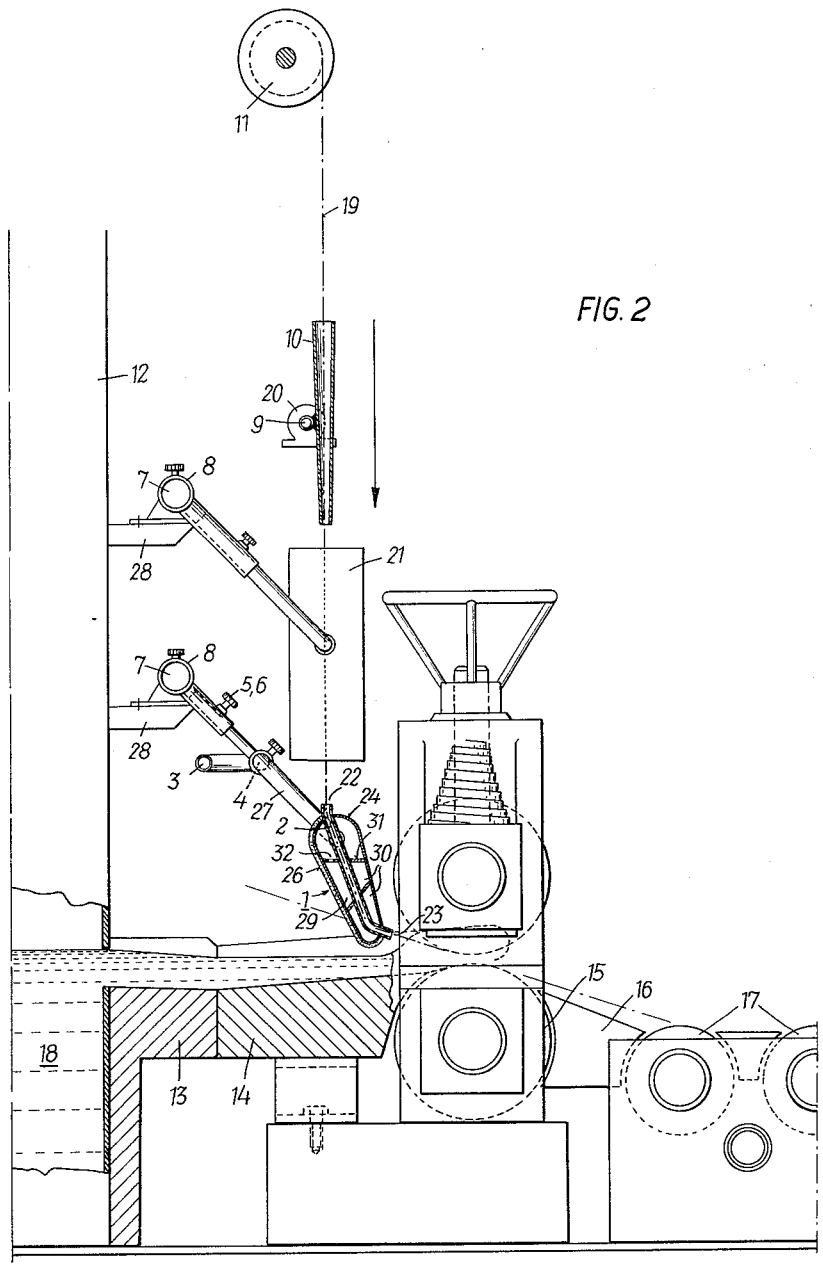
FIG. 2 is a schematical view showing the apparatus according to the present invention.

The process according to the invention proceeds as shown by arrows in FIG. 2, between elements 11 and 17 (direction of the run of the reinforcing material) and from 12 to 17 (flow direction of the glass 18 from the vat 12).

The liquid glass 18 flows from the batch vat 12 over the glass run piece 13 and over the machine piece 14 of a glass rolling machine of known construction and provided with extrusion rollers 15.

The reinforcing material is stored on storage devices 11 (rollers or the like) which are preferably spring loaded and as a rule are located above the rollers 15; thence the reinforcing material is picked up and, in view of the ultimate simultaneous embedding in the glass of a plurality of strands of wire, the material is at this stage already spacedly positioned over guiding and unrolling devices from where it is led to the cooling device or devices carefully shielded from the glass production stage. The reinforcing material (individual wires, wire strands, wire meshes, weaves or the like) is conveyed at a speed substantially corresponding to that of the glass band. The reinforcing materials are passed through cooling devices either immediately after being taken up from the storage location, or at least a certain distance before they are embedded in the glass band; within the range of the cooling devices the reinforcing materials are subjected to the protection of cooling on all sides in their longitudinal direction, and are deflected inside the cooling devices in a direction such that upon exit from the cooling devices they are located directly above the glass stream and are introduced into the glass band in the required embedding plane at a location where as a rule the glass heaps up.

The invention avoids the above-mentioned disadvantageous action of heat of radiation on the reinforcing material to such an extent that the reinforcement is embedded in cold and thus undamaged condition. Over the very short distance which the reinforcing material covers from the point where it leaves the cooling device to where it enters the glass band, no disadvantageous effects can occur.

Even though it is possible to use ferrous materials for reinforcing purposes which had previously given only bad results, it is has been found that wires of non-ferrous metal or wires clad with non-ferrous alloys present substantially advantageous physical and chemical characteristics for embedding in glass. For the maintenance and corresponding utilization of these advantageous characteristics of wires of non-ferrous metal or non-ferrous alloys it is essential to provide for careful cooling.

Any desired cooling media may be employed for cooling the reinforcing material against the heat of radiation of the glass, but to avoid any detrimental influence of the wire cooling on the temperature of the glass, liquid cooling is preferred to air cooling. In addition care must be taken to provide shielding for the cooling action.

The apparatus for carrying out the process described above is shown schematically by way of example in the drawing.

FIG. 2 illustrates the supply of wire 19 from the storage rolls 11 which are preferably made of light metal and rotatably mounted on one or more axes. From the storage rolls the wire 19 is led over positioning devices, for example racks, rollers or—as shown in the drawing—conical pipes 10, which serve as directing means where parallel wires are to be introduced. These devices are also useful for avoiding damage from backlash should the wire break. The rejoining operation is also easier if the wires are led in this manner. In the case of meshes, rollers of the rib-, pin- or similar type must be used to afford uniform progress of the wire mesh. Longitudinal shells may also be provided in the direction of movement for the same purpose. To suit the direction of pull of the wire to the position of the cooling device, corresponding to the introduction of the wire in the glass band, the guiding pipes or the like are secured to a preferably tubular carrying wheel 9 which is rotatably mounted in bearings 20. After passing the guide element the reinforcing material may be led to an installation 21, where it may be subjected to suitable surface treatments if desired, such as coating the wire with a protective layer to increase its resistance, or with a colour coating, or to a surface treatment such as roughening, smoothing or the like. The cooling device 1, which is tiltably mounted on a carrying arm 27 and may be raised or lowered by means of positioning screws 5 and 6, as well as be displaced sideways in the support 7, 8, has at its upper end inlet openings 22 in the jacket 24 for small pipes or, for example, flat passage channels 2, which receive the reinforcing material 19 in the interior of the jacket 24. If wire meshes are used instead of wires, the inlet openings 22, the guiding channels 2 and the outlet openings 23 must be fitted to the shape of the reinforcing material.

To avoid interference of the cooling process with the glass flow, in particular to prevent the glass from stiffening too early, the cooling device is shielded from the glass by the provision of insulation 26, particularly on its sides which face the glass stream.

The cooling device 1 is, as mentioned above, pivotally secured to one or more carrying arms 27 which are mounted on a shelf 28 attached, for example, to the batch vat 12.

Figure 3:
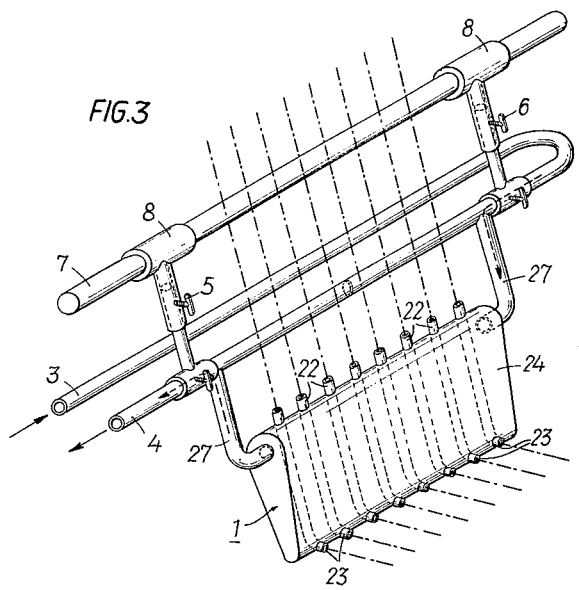
FIG. 3 is a perspective view of the wire guiding and cooling device.

FIG. 3 is a perspective view of the cooling device 1, to which are connected inlet pipes 3 and outlet pipes 4 for supply and discharge of the cooling medium. The position and direction of the guiding pipes 2 inside the cooling and deflecting device 1 is shown in dotted lines. The reinforcing material is introduced into the channels 2 of the cooling device through the upper openings 22 and is forwarded in the direction of the glass band 18 through the outlet openings 23. Except for the inlet openings 22 and the outlet openings 23, which are left open, the cooling device is enclosed on all sides in a jacket 24. Adjusting devices 5 and 6 are provided to vary the spacing of the cooling device 1 from the glass stream 18. The cooling device is carried by elements 27 pivotally mounted on a transverse holder 8.

Even though the illustrated cooling device is only an embodiment given by way of example, it has been found that the arrangement of the cooling device—as shown—in relation to the glass band, and its inclination to the vertical, are particularly advantageous. In this manner the cooling device is exposed as little as possible to the radiation from the molten glass, so that deleterious effects of the high glass temperature on the reinforcing material are prevented as nearly as possible; on the other hand damaging cooling effects of the cooling device on the glass stream are also avoided.

The specially shaped guiding pipes 2 in the interior of the cooling device 1 have the purpose of allowing the reinforcing material to slide therein and, due to the special shape of the lower part of these pipes, to give it the required change of direction for the subsequent introduction into the glass band. The bent shape of the pipes in the direction of their lower mouth-piece, as shown, leads the wire to a side of the cooling device turned away from the glass, and out of the cooling device into the glass band.

Since the cooling device is exposed continuously to the radiant heat of the highly plastic glass, very intensive charging with cooling medium is required. For this purpose the hollow cooling jacket 24 is divided into two or more chambers 29 and 30 by partitions 31, which may be provided with openings 32 if the chambers are to be in communication with each other, or may be made without partitions if each chamber is to be cooled separately in order to obtain very intensive cooling. Accordingly the cooling device may be provided not only with one inlet and one outlet for supply and discharge of the cooling medium, but with several such inlets and outlets according to the cooling cycle which is to be carried out. Reliably uniform cooling of the reinforcing material can be further influenced by suitably arranging the cooling pipes and chamber system.

Since in the modern construction art glass is increasingly in use and demand, there is a tendency to develop this material so that its use is satisfactory both from a technical and an architectural point of view.

By means of the invention it is possible to reinforce glass plates and sections, especially using non-ferrous metal wires and reinforcements, so as to meet any strength requirements. The shape and the—optional—colour treatment of the reinforcing material produce effective inlays, so as to open up new perspectives for the architectural use of reinforced glass.

The embodiments of the invention in which an exclusive property or privilege is claimed are defined as follows:

1. In an apparatus for continuous production of reinforced glass, in combination, support means; a pair of rolls mounted on said support means turnable about parallel substantially horizontal axes; means for feeding a stream of molten glass in substantially horizontal direction between said pair of rolls for continuously forming a sheet of glass during rotation of said rolls; means for guiding said sheet of glass emanating from the rolls in a substantially horizontal plane; guide means for guiding reinforcing wire into said stream of glass, said guiding means including a plurality of closed tubular guide channels each of said closed tubular guide channels completely surrounding and guiding reinforcing wire and having a main portion inclined at a steep angle to said stream of glass and an outlet portion extending transversely to said main portion and slightly inclined to said plane; and a closed cooling jacket completely surrounding said closed tubular guide channels substantially over the whole length thereof, said cooling jacket having a bottom portion located between the stream of glass and said outlet portion at a lower elevation than the latter.

2. In an apparatus for continuous production of reinforced glass, in combination, support means; a pair of rolls mounted on said support means turnable about parallel substantially horizontal axes; means for feeding a stream of molten glass in substantially horizontal direction between said pair of rolls for continuously forming a sheet of glass during rotation of said rolls; means for guiding said sheet of glass emanating from the rolls in a substantially horizontal plane; guide means for guiding reinforcing wire into said stream of glass, said guiding means including a plurality of closed tubular guide channels each of said closed tubular guide channels completely surrounding and guiding reinforcing wire and having a main portion inclined at a steep angle to said stream of glass and an outlet portion extending transversely to said main portion and slightly inclined to said plane; a closed cooling jacket completely surrounding said channels substantially over the whole length thereof, said cooling jacket having a bottom portion located between the stream of glass and said outlet portion at a lower elevation than the latter; inlet means for feeding a cooling fluid into said jacket; outlet means for discharging cooling fluids therefrom, said inlet and outlet means communicating with the interior of the jacket at a location distant from the stream of molten glass and insulating means covering said cooling jacket at least at the side thereof facing the stream of glass.

3. An apparatus according to claim 2, wherein the cooling jacket is divided into chambers.

4. An apparatus according to claim 3, wherein said chambers are in communication with each other.

5. An apparatus according to claim 3, wherein each cooling chamber has separate inlet and outlet means for a cooling medium.

References Cited by the Examiner

UNITED STATES PATENTS

| | | | |
|---|---|---|---|
| 1,829,409 | 10/31 | Kingsley | 65—51 |
| 2,062,228 | 11/36 | Lamesch | 65—51 |
| 2,717,475 | 9/55 | McCarthy | 65—59 X |
| 2,836,935 | 6/58 | Stanworth | 65—43 X |
| 2,873,556 | 2/59 | Hainke | 65—51 |
| 3,088,298 | 5/63 | Mols | 65—51 |

DONALL H. SYLVESTER, *Primary Examiner.*